(No Model.) 3 Sheets—Sheet 1.

F. CHALLONER.
SHINGLE SAWING MACHINE.

No. 582,601. Patented May 11, 1897.

Witnesses
Eb Asmur
Chas. L. Goos

Inventor
Frank Challoner
By Winkler Flanders Smith Bottum & Vilas
Attorneys.

(No Model.) 3 Sheets—Sheet 2.
F. CHALLONER.
SHINGLE SAWING MACHINE.

No. 582,601. Patented May 11, 1897.

(No Model.) 3 Sheets—Sheet 3.

F. CHALLONER.
SHINGLE SAWING MACHINE.

No. 582,601. Patented May 11, 1897.

Witnesses:
Inventor:
Frank Challoner
By Winkler Flanders Smith Bottom
Attorneys.

United States Patent Office.

FRANK CHALLONER, OF OSHKOSH, WISCONSIN.

SHINGLE-SAWING MACHINE.

SPECIFICATION forming part of Letters Patent No. 582,601, dated May 11, 1897.

Application filed October 26, 1891. Serial No. 409,780. (No model.)

*To all whom it may concern:*

Be it known that I, FRANK CHALLONER, of Oshkosh, in the county of Winnebago and State of Wisconsin, have invented certain new and useful Improvements in Shingle-Sawing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to that class of shingle-sawing machines which employ a horizontal saw and one or more reciprocating carriages constructed and arranged to pass alternately over the saw.

It consists of certain peculiarities in the construction and arrangement of the machine, particularly with respect to the carriage feeding and driving connections, hereinafter particularly described, and pointed out in the claims.

In the accompanying drawings like letters designate the same parts in the several figures.

Figure 1:
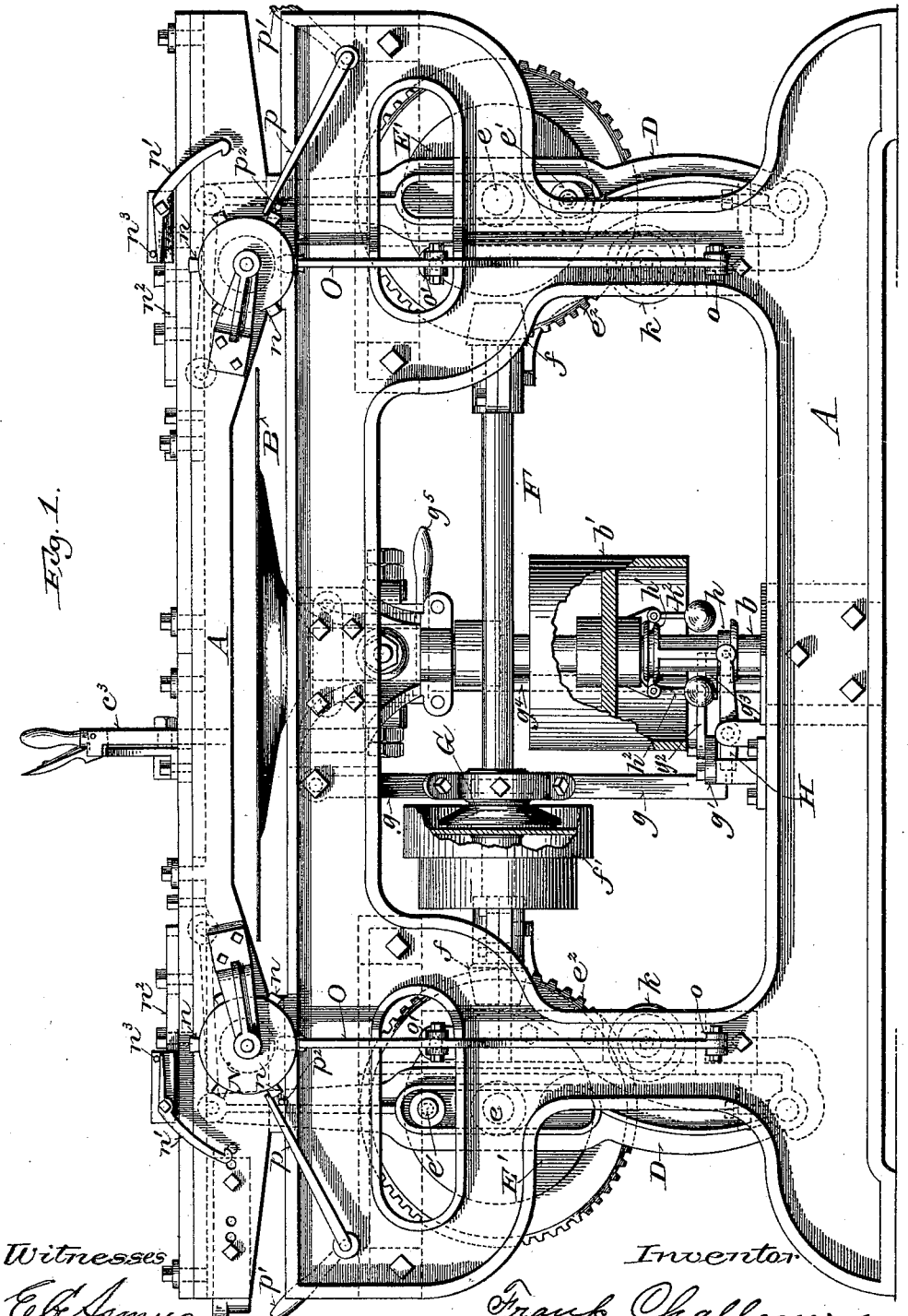
Figure 2:
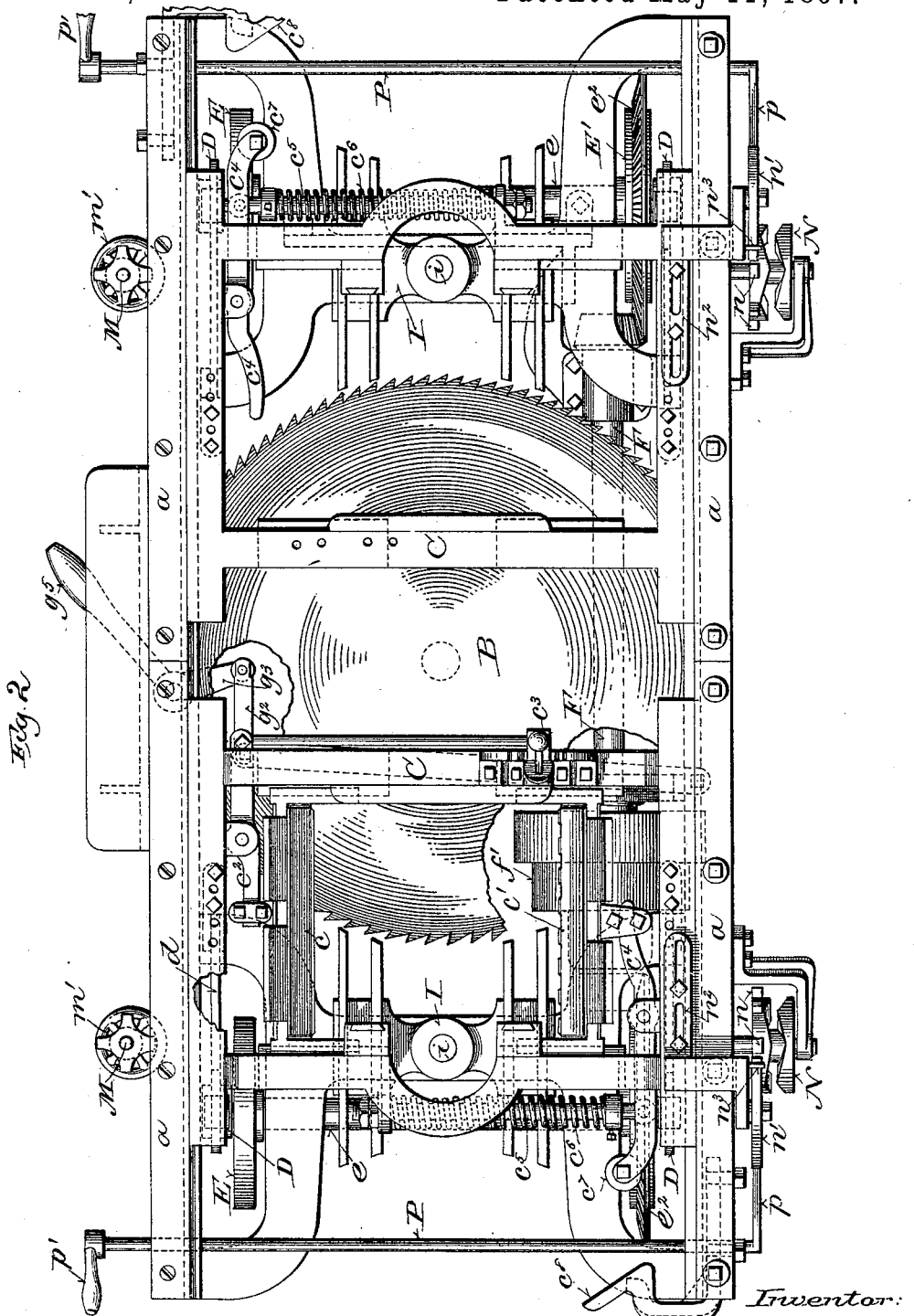
Figure 3:
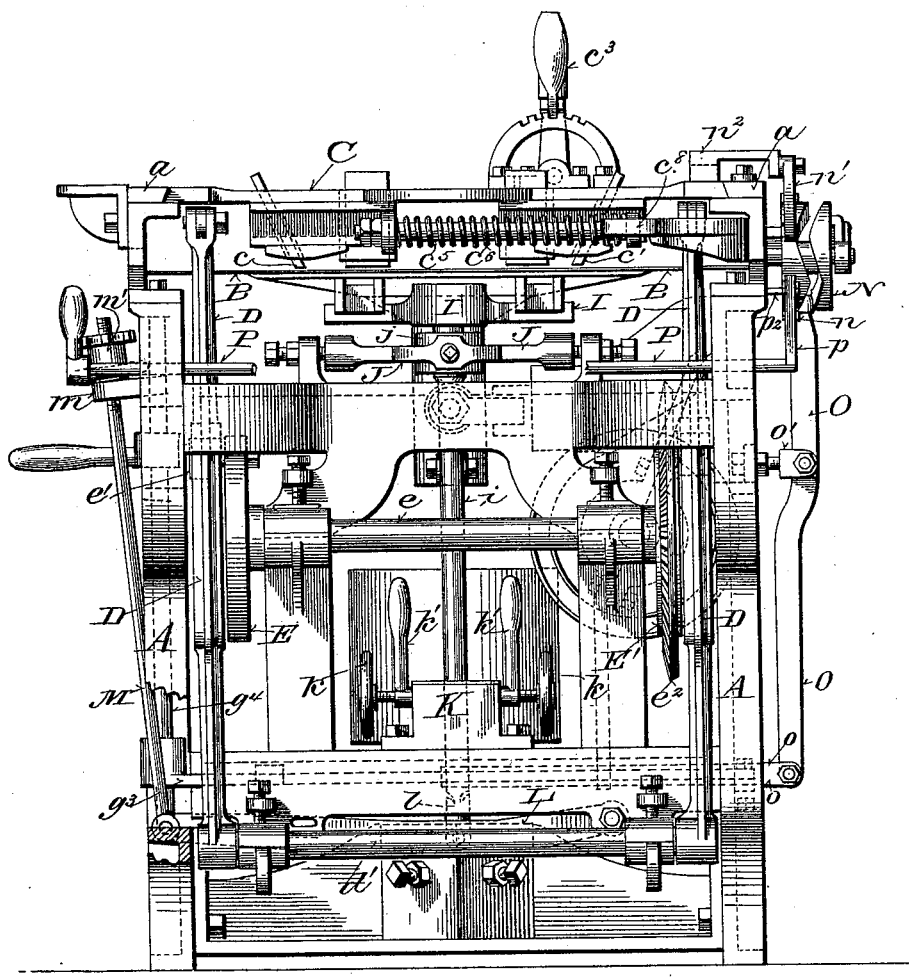

Figure 1 is a side elevation of my improved machine. Fig. 2 is a plan view, and Fig. 3 an end elevation, of the same.

A represents the frame of any suitable shape and construction to support and provide bearings for the mechanism hereinafter described. It is provided at the top on each side with horizontal ways $a\ a$ for the reciprocating carriages.

B is a horizontal shingle-saw of the usual construction mounted upon the upper end of the vertical arbor $b$, which is furnished with a belt-pulley $b'$.

C C are carriages supported in the ways $a\ a$ and adapted to be moved horizontally in alternation over the saw B. They are constructed to receive and hold a single shingle-bolt and are provided in the usual manner with a relatively-fixed dog $c$ and a movable dog $c'$. The dog $c$ of each carriage is preferably made adjustable toward and from the center of the carriage to adapt it to bolts of varying lengths. For this purpose it is mounted at the ends upon suitable ways on the carriage in a similar manner to the movable dog $c'$. A lever $c^2$, fulcrumed to the adjacent side of the carriage, is connected at one end with the dog $c$ and at the other end with an upright hand-lever $c^3$, fulcrumed to the rear end of the carriage, or the end nearest the saw, and provided with a spring-catch which works with a notched quadrant mounted on the carriage. A lever $c^4$, fulcrumed to the other side of the carriage, is connected at one end with the movable dog $c'$ and near its other end with a rod $c^5$, which has a sliding bearing in the front end of the carriage and is surrounded by a spring $c^6$, bearing at one end against said bearing and at the other and outer end against a collar adjustably mounted upon said rod. At its front or outer end the lever $c^4$ is provided with a friction-roller $c^7$, adapted to engage with an incline $c^8$, adjustably attached to the frame of the machine in the required position to open the dog $c'$ as the carriage approaches and completes its outward or backward movement.

The mechanism by which the carriages are fed alternately back and forth from the tilt-tables to the saw may by described as follows:

At or near each end of the machine yokes or slotted arms D D are connected at their upper ends by links $d\ d$ with the sides of the adjacent carriage and are rigidly mounted at their lower ends upon a rock-shaft $d'$.

E E' are crank-wheels mounted upon the ends of a horizontal shaft $e$, above the rock-shaft $d'$, and having their crank-pins $e'$ inserted in the slots in yokes D, so that when the shaft $e$ is rotated a vibrating movement will be imparted through said crank-pins to the yokes D and a reciprocating movement to the carriage with which said yokes are linked. The crank-wheel E' is formed or provided with a bevel-gear $e^2$.

It will be understood that the carriages and their driving connections at each end of the machine are duplicates of each other.

F is a driving-shaft supported longitudinally of the machine in suitable bearings in the plane of the shafts $e\ e$ and provided at the ends with bevel-pinions $f\ f$, which mesh with the gears $e^2\ e^2$.

$f'$ is a driving-pulley, preferably coned to vary the speed, mounted loosely upon the shaft F.

G represents a clutch, one member of which is attached to the pulley $f'$ and the other, which is feathered upon the shaft F, to an upright lever $g$. This lever is connected with or bears at its lower end against a lever $g'$, fulcrumed at one end to the base of the machine, and passing horizontally across the same and connected at the other end by a link $g^2$ with arm $g^3$, on a vertical rock-shaft $g^4$, which is provided at its upper end, in a position conveniently accessible to the operator, with a hand-lever $g^5$, whereby the carriage-feeding mechanism may be connected or disconnected through the clutch G.

It will be observed by reference to Fig. 1 that while the crank-pins $e'$ at one end of the machine are in or near one end of the slots in yokes D the crank-pins at the opposite end of the machine are in or near the opposite ends of the slots in the yokes with which they engage, and the crank-wheels being turned by the pinions $f$ and gears $e^2$ in opposite directions it is obvious that as one carriage is advanced slowly toward and over the saw B the other carriage will be rapidly withdrawn therefrom. The carriages are thus alternately advanced over and withdrawn from the saw with a slow forward and a quick backward movement.

To provide against the shingle-bolts breaking or injuring the saw in case it should accidentally stop while the carriages are in motion, I furnish the machine with a connection with the saw-arbor, whereby the clutch G will be automatically thrown out of gear when the saw B stops. This connection consists of a lever H, fulcrumed in a horizontal position to the frame of the machine, so that one end may be raised into engagement with the lever $g'$ or a projection thereon and hold the same in position to retain the clutch G in engagement. This lever acts as a gravitating pawl for holding the clutch in gear. At its opposite and heavier end it is forked and provided with pins or projections, which rest upon a flanged collar $h$, which is mounted and capable of endwise movement upon the saw-arbor $b$. This collar $h$ is formed or provided with a grooved collar $h'$, in the groove of which are inserted the short arms of weighted angle-levers $h^2$, fulcrumed to the hub of pulley $b'$ or to the arbor $b$, on which it is mounted. When the saw is in operation, the rotation of its arbor by its centrifugal force carries the longer weighted arms of levers $h^2$ outwardly toward a horizontal position, thereby moving the collars $h$ and $h'$ downwardly on the saw-arbor and permitting the shorter arm of lever H to rise. When now the clutch G is thrown into engagement by the operator through the hand-lever $g^5$ and the connections hereinbefore described, the lever or pawl H will drop behind the lever $g'$ or the projection thereon and lock the clutch in engagement, but should the saw-arbor stop for any cause the longer arms of the weighted levers falling to a perpendicular position, as shown in Fig. 1, will move the flanged collar $h$ upwardly on the saw-arbor, thereby lifting the longer arm and lowering the shorter arm of the pawl H out of engagement with the lever $g'$, thus automatically releasing and throwing out of gear the clutch G.

I I are the tilt-tables of the usual or any suitable construction, one located at each end of the machine in position to receive the shingle-bolt from the corresponding carriage when the latter is at the extreme limit of its outward or backward movement. Each tilt-table is mounted upon the upper end of an upright bar $i$, which has a universal-joint connection near its upper end with the frame of the machine, consisting of a sleeve $j$, through which the tilt-bar $i$ loosely passes, and a yoke J, in which said sleeve is pivoted in a line at right angles to the line in which the yoke is pivoted to the frame of the machine. Near its lower end the tilt-bar passes through a slotted block K, which is provided on both sides with hand adjusting-screws $k\ k$ for regulating the vibratory movement of the tilt-bar, and with jam-nuts having handles $k'\ k'$ for locking the adjusting-screws $k$ in place when they are properly set. At its lower end the tilt-bar rests in a step-block $l$, pivoted in a horizontal lever L, which is fulcrumed at one end to the frame of the machine and connected at the other end with a vertical rod M, passing at its upper end through a perforated ear $m$ on the frame of the machine, and provided above said ear with a nut $m'$, by which the step-lever L is swung vertically on its fulcrum to raise or lower the tilt-table for producing shingles of different thicknesses.

The relative thicknesses of the butts and points of the shingles are changed as desired by means of the adjusting-screws $k\ k$, whereby a greater or less amplitude of vibration of the lower end of the tilt-bar is permitted. For automatically changing the inclination of the tilt-tables, so as to cut the butts and points alternately from opposite ends of the shingle-bolts, the machine is provided at each end adjacent to one of the carriage-ways with a cam N, having a zigzag groove in its periphery and teeth $n\ n$ at intervals, corresponding with the turns in the cam-groove. A vertical lever O, fulcrumed to the side of the machine-frame, projects at its upper end into the groove of the adjacent cam and is connected at its lower end by a rod $o$ with the bar $i$ of the adjacent tilt-table. Each carriage is provided with a gravitating hook $n'$, pivoted to a block $n^2$, adjustably attached to the side of the carriage adjacent to the cam N, and provided with a pin $n^3$, against which a projection of the hook $n'$ strikes, thus limiting the downward movement of the hook. Each time either carriage advances its hook $n'$ engages with one of the teeth $n$ and turns the adjacent cam N an interval, thus acting through the lever O and connecting-rod $o$ to shift the tilt-table, so that when the carriage returns and the shingle-bolt therein is dropped upon the tilt-table its inclination will be reversed, and the butt end of the next shingle will be taken from the opposite end of the shingle-bolt. In its backward movement each hook $n'$ rides loosely over the teeth of the adjacent cam without turning the same.

To prevent the alternate change in the inclination of either tilt-table for the purpose of "graining" a shingle-bolt, I provide at each end of the machine a cross-shaft P, having at one end an arm $p$, which is arranged to engage with a tooth on the cam N and turn the latter backward sufficiently to cause the hook $n'$ on the adjacent carriage to clear the tooth $n$, which it would otherwise engage with, for reversing the inclination of the tilt-table. Each cross-shaft P is provided with a handle $p'$ for turning it, and a stop $p^2$ is provided on the frame of the machine for arresting the movement of the arm $p$ at the proper point.

Various modifications may be made in the details of the machine within the intended scope of my invention—as, for instance, the gears $e^2$ may be made distinct from the adjacent crank-wheels E'.

It will be observed that the levers O are connected with the frame A by adjustable fulcrum-bearings $o'$, which have threaded stems passing loosely through the side plates of the frame, and are provided on opposite sides of said plates with nuts, whereby the fulcrums of said levers may be moved in or out, so as to give the desired movement to the tilt-bars $i$ without disconnecting said levers.

It will be observed also that the vibratile arms D D are placed inside of the frame A A, where they are out of the way and protected. The machine is thus made more compact and self-contained, and danger to the attendants or persons passing the machine, as well as injury and disturbance of the carriage-actuating connections, is avoided.

It is of importance in this class of machines to leave a clear space under the saw for the dropping of shingles as they are severed from the blocks, and for this purpose the longitudinal driving-shaft F is located as close as practicable to the rear side of the frame, as shown in Fig. 2.

I claim—

1. In a shingle-sawing machine, the combination with a suitable frame having horizontal ways, of a horizontal saw, two reciprocating carriages movable alternately back and forth in said ways over said saw, longitudinally-slotted vibrating arms pivoted at their lower ends to the frame of the machine and connected at their upper ends with the sides of the respective carriages, cross-shafts having cranks engaging with the slots in said arms, a longitudinal driving-shaft geared with said crank-shafts and provided with a driving-pulley loosely mounted thereon, and a clutch for connecting and disconnecting said pulley with said shaft, substantially as and for the purposes set forth.

2. In a shingle-sawing machine, the combination with the saw and a reciprocating carriage having separate driving connections, of a clutch for connecting and disconnecting the carriage with its driver, and an automatic releasing device connected with the saw-arbor so as to throw the clutch out of gear when the movement of the saw is stopped, substantially as and for the purposes set forth.

3. In a shingle-sawing machine, the combination with the saw and a reciprocating carriage having separate driving connections, of a clutch for connecting and disconnecting the carriage-feeding mechanism, a detent for holding said clutch in engagement, weighted levers fulcrumed to the saw-arbor, and a flanged collar movable lengthwise on the saw-arbor in engagement with said weighted levers and arranged when the saw stops and the weighted levers drop to trip said detent and release the clutch, substantially as and for the purposes set forth.

4. In a shingle-sawing machine, the combination with the saw and one or more reciprocating carriages having suitable driving connections, of a clutch for connecting and disconnecting the carriage-feeding mechanism with a suitable driver, a hand-lever connected with one member of said clutch and arranged to move the same into engagement with the other member, a gravitating detent arranged to automatically lock the clutch in engagement, and a centrifugal governor device mounted upon the saw-arbor and arranged to trip said detent and release the clutch when the saw stops, substantially as and for the purposes set forth.

In testimony that I claim the foregoing as my own I affix my signature in presence of two witnesses.

FRANK CHALLONER.

Witnesses:
CHAS. L. GOSS,
E. C. ASMUS.